June 2, 1970 S. G. CASSADY 3,514,934
CUTTING ASSEMBLY
Filed April 10, 1967 2 Sheets-Sheet 1
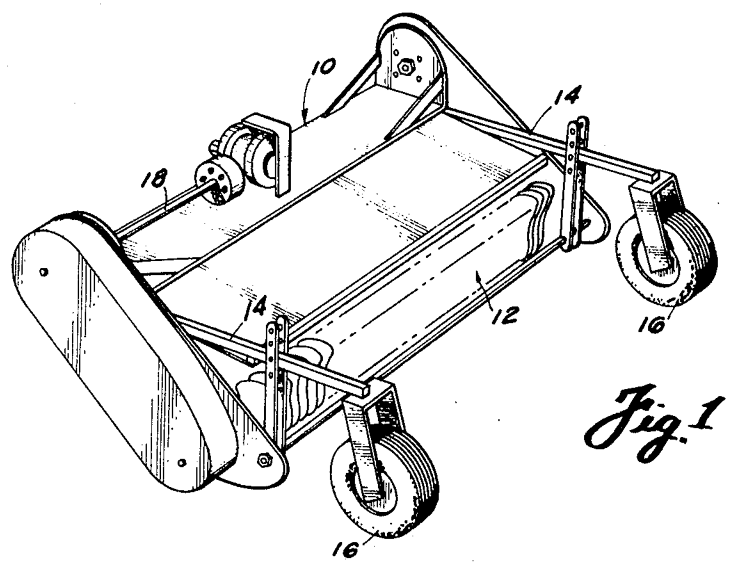
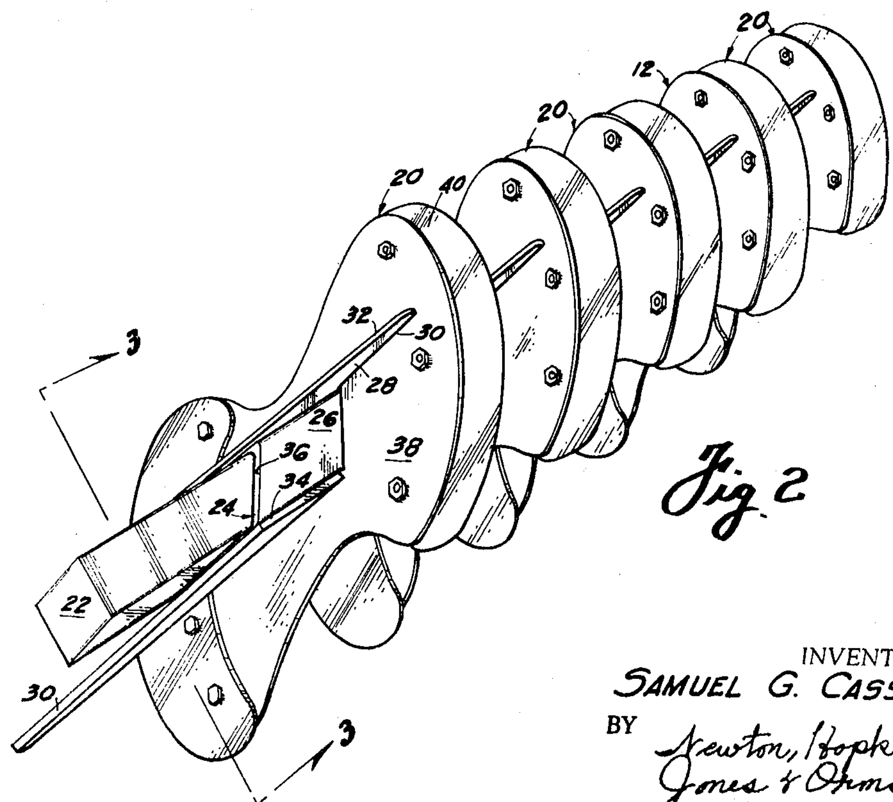
INVENTOR.
SAMUEL G. CASSADY
BY Newton, Hopkins, Jones & Ormsby
ATTORNEYS CUTTING ASSEMBLY
Filed April 10, 1967 2 Sheets-Sheet 2
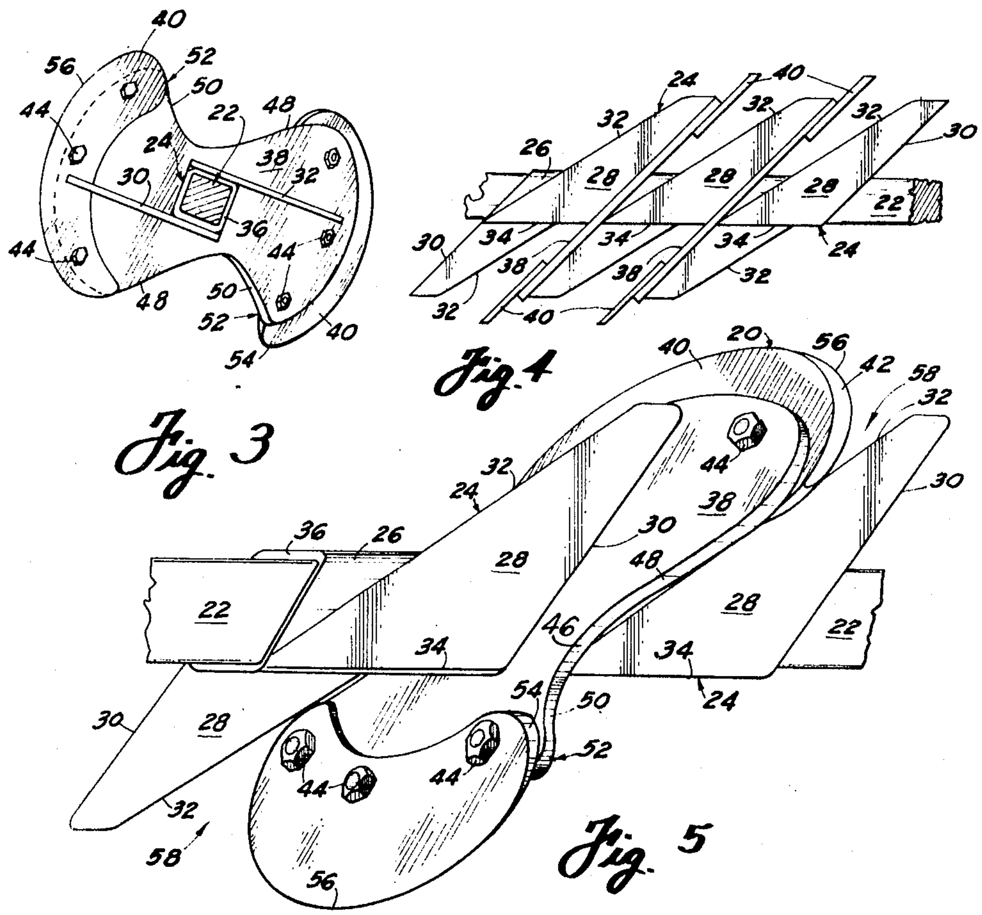
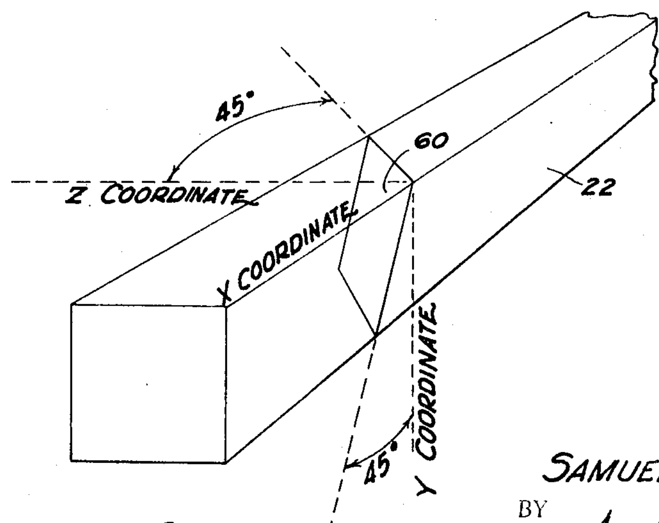
Fig. 6
INVENTOR.
SAMUEL G. CASSADY
BY
Newton, Hopkins,
Jones & Ormsby
ATTORNEYS

United States Patent Office 3,514,934

Patented June 2, 1970

3,514,934
CUTTING ASSEMBLY

Samuel G. Cassady, 3434 Montreal Way, Tucker, Ga. 30084

Filed Apr. 10, 1967, Ser. No. 629,447
Int. Cl. A01d *55/20*
U.S. Cl. 56—294 11 Claims

ABSTRACT OF THE DISCLOSURE

A mowing machine cutting assembly comprising a plurality of axially aligned substantially elliptical blade assemblies angularly mounted on a rectangular rotatable drive shaft. The blade assemblies are appropriately arranged and separated from one another along the length of the drive shaft by spacing members which serve to transmit the rotational velocity of the drive shaft to the blade assemblies while also supporting those assemblies during the cutting operation. Each blade assembly has a pair of opposed slightly overlapping arcuate cutting surfaces which define, in rotation, a right circular cylinder. The cutting surfaces of the blade assembly overlap adjacent cutting surfaces of adjacent blade assemblies so that a series of integrated right circular cylinders are created by the rotation of the drive shaft and the cutting assembly.

BACKGROUND OF THE INVENTION

The present invention relates to cutting assemblies for mowing machines. More particularly, the present invention relates to a cutting assembly having a plurality of substantially elliptically-shaped axially aligned blade assemblies which generate in rotation an integrated series of right circular cylinders arranged along a drive shaft.

Mowing machines with their accompanying appurtenances generally perform the function of cutting vegitation material standing in a field or yard. For severing the material both reel and blade structures have been provided which accomplished the intended result but often created ancillary problems. Frequently, the reel structure became entangled in the cut material and subsequent damage of the drive mechanism and cutting surface resulted. The blade structures proved quite dangerous in that rocks and other solid objects were ejected from the machine at quite high velocities. In addition, both reel and blade structures had cutting surfaces which failed to retain a sharp edge over a long period of time.

SUMMARY OF THE INVENTION

It is therefore a primary object of the present invention to provide a cutting assembly which is relatively simple in construction but long-lasting in use.

Another object of this invention is the provision of a cutting assembly which slices presented vegetation material while pulling that vegetation material upwardly against the resistance of its root structure.

A further object of the present invention is the provision of a rotating cutting assembly which generates an angular slicing motion to sever presented vegetation in a substantially angular plane.

Another object of the invention is the provision of individual blade assemblies having partially overlapping blade portions which in rotation generate a right circular cylinder.

Another object of the invention is the provision of a cutting assembly which propels solid objects from beneath the machine at a velocity slower than the rotational velocity slower than the rotational velocity of the blade assembly.

A further object of the invention is the provision of a cutting assembly having contoured cutting surfaces which ride over non-ejected solid objects.

Another object of the present invention is the provision of a blade assembly having a pair of opposed easily replaceable blade portions.

A further object of the invention is the provision of a cutting assembly which cleanly severs presented vegetation and leaves a substantially smooth and flat cut surface.

Briefly described, the cutting assembly of the present invention which achieves the above objects and possesses other features and advantages comprises a series of spaced apart substantially elliptical blade assemblies axially and angularly mounted on a rotatable rectangular drive shaft. Each blade assembly extends from the drive shaft at approximately a 45° angle with respect to the Y and Z coordinates of an orthogonal three-dimensional coordinate system superimposed on the cutter assembly so that the X coordinate corresponds to the drive shaft. Moreover, the blade assemblies are spaced apart by a spacing member which serves to transmit the rotational force of the drive shaft to the blade assemblies while also supporting those blade assemblies in the cutting operation. Each blade assembly has a pair of opposed slightly overlapping arcuate cutting surfaces which circumscribe a right circular cylinder when the blade assembly is rotated. The cutting surfaces of adjacent blade assemblies overlap so that a series of integrated right circular cylinders is generated along the length of the drive shaft when the cutting assembly is rotated.

Other objects, features and advantages of the present invention will become apparent from the following description, when taken in conjunction with the accompanying drawings, wherein like characters of reference designate corresponding parts throughout the several views.

BRIEF DESCRIPTION OF THE DRAWINGS

FIG. 1 is a perspective view of the cutting assembly positioned within a mowing machine.

FIG. 2 is a perspective view of the cutting assembly of the present invention.

FIG. 3 is a vertical section of the cutting assembly taken along line 3—3 of FIG. 2.

FIG. 4 is a front perspective view of the cutting assembly taken at a 45 degree angle to the Z coordinate of a three-dimensional orthogonal coordinate system having X and Y as the horizontal and vertical coordinates.

FIG. 5 is a rear elevational view of one blade assembly in position on its drive shaft.

FIG. 6 is a schematic view of an orthogonal three dimensional coordinate system superimposed on the drive shaft of the present invention so that the X coordinate corresponds to the drive shaft. The view schematically illustrates the angular relationship between the blade assembly and the drive shaft.

DESCRIPTION OF THE ILLUSTRATED EMBODIMENT

Referring specifically to FIG. 1 of the drawings, an appropriately environmental mowing machine 10 is disclosed housing the cutting assembly 12 of the present invention. Mowing machine 10 consists generally of a carriage 14 having a pair of spaced apart and opposed support wheels 16 extending from the rear end of the carriage and a power transmission 18 to transmit driving force from a source (not shown) to the drive shaft of the cutting assembly. Power transmission 18 supplies an amount of force to the drive shaft to produce a preferable rotational velocity of the shaft from 3600 to 4000 R.P.M. This velocity produces a cutting action sufficient to accomplish the severing, chopping or cutting of low grass, heavy weeds, small saplings and small bushes when the cutting assembly 12 defines a cylinder of revolution having a diameter of approximately 7 inches. As such, the mowing machine is quite suitable for use in both general ground clearance work and accurate and precise lawn mowing.

Referring to FIG. 2, cutting assembly 12 is shown removed from its position in mowing machine 10. The cutting assembly 12 generally comprises a series of axially aligned substantially elliptically-shaped blade assemblies 20 axially mounted on a rectangular drive shaft 22 and spaced apart from one another by spacing members 24. Each blade assembly 20 is angled with respect to drive shaft 22 as will be explained in more detail hereinafter. Spacer members 24 serve a triple function of not only separating adjacent blade assemblies, but also supporting those blade assemblies during the cutting operation and transmitting the rotational velocity of the drive shaft 22 to the blade assemblies.

Spacer members 24 comprise substantially rectangular collars 26 closely conforming in interior configuration to the exterior configuration of drive shaft 22. Collars 26 carry substantially triangular support fingers 28 affixed to opposite sides of the collar and extending in opposite directions therefrom. Fingers 28 (as shown in FIGS. 4 and 5) have a leading edge 30 for engagement with a blade assembly 20, a trailing edge 32 and a securing edge 34 adjacent collar 26. Leading edge 30 engages blade assembly 20 and is secured thereto as by welding. Collars 26 have opposed side edges 36 which also engage adjacent blade assemblies 20 and are secured thereto as by welding. Consequently, the rotation of drive shaft 22 causes rotation of collars 26 which through their welded areas with blade assemblies 20 cause rotation of those blade assemblies. Collars 26 are of a width sufficient to properly space adjacent blade assemblies and withstand a great deal of stress and strain associated with the rotation of blade assemblies 20.

Referring to FIGS. 3, 4 and 5, it may be seen that blade assemblies 20 comprise a central support plate 38 which carries opposed blade portions 40 having arcuate distal cutting surfaces 42. The blade portions 40 of one blade assembly are aligned with adjacent blade portions of adjacent blade assemblies and are removably affixed to opposite sides and opposite ends of plate 38 by conventional removable securing means such as nut and bolt arrangements 44. Plate 38 defines a pair of opposed recessed portions 46 along opposite sides of the plate between blade portions 40. Recessed portions 46 have a gently tapering trailing edge 48 and a more radically tapering leading edge 50. Leading edge 50 forms a shoulder portion 52 immediately preceding blade 40 when blade assembly 20 is rotated over and toward the travel direction of the mowing machine 10. Shoulder portion 52 and leading edge 50 have a radius or curvature less than the radius of curvature of arcuate cutting surface 42. Therefore, extraneous objects in the path of the cutting assembly will be engaged by shoulder portion 52 and leading edge 50 and propelled from beneath the mowing machine before damage or injury results to the cutting surface 42. Moreover, since the radius of curvature of shoulder 52 is less than the radius of curvature of cutting surface 42, the ejected article will be propelled from beneath the machine at a velocity less than that created by contact with the cutting surface. In addition, cutting surface 42 has several inwardly tapering end surfaces 54 immediately adjacent shoulder 52 which will gently introduce cutting surface 42 to extraneous articles not ejected by shoulder 52. Therefore, cutting assembly 20 will ride over extraneous articles rather than strike them full face.

Cutting surfaces 42 are beveled downwardly toward the side of blade portion 40 attached to support plate 38. This bevel creates a cutting edge 56 on the opposite side of blade portion 40 remote from support plate 38 and leading edge 30 of finger 28.

As shown in FIGS. 4 and 5, leading edges 30 of support fingers 28 engage support plates 38 along those sides of plates 38 immediately opposite from those sides engaging blade portions 40. Consequently, fingers 28 support plates 38 against forces generated through blade portions 40 to plates 38. Also, it may be seen that one support finger 28 of each spacing member 24 engages one cutting assembly while the opposed finger 28 engages an adjacent cutting assembly. The trailing edges 32 of support fingers 28 are spacially removed from the adjacent cutting assemblies 20 and define cut material passageways 58 adjacent cutting edges 56. As a passageway 58 lies adjacent each cutting edge 56, discharge of severed, chopped and cut material is vastly facilitated.

Referring specifically to FIGS. 5 and 6, it may be seen that blade assemblies 20 extend from drive shaft 22 and are angled with respect thereto within two of the three coordinate planes of a three-dimensional orthogonal coordinate system. As shown best in FIG. 5 where the section 60 represents the plane of cutting assemblies 20 with respect to drive shaft 22, section 60 is angled with respect to the drive shaft at a 45° angle to the Y axis and a 45° angle to the Z axis. This degree of angularity represents the optimum arrangement of the blade assemblies on the drive shaft but should not be construed to overly limit the scope of the invention. It has been found, though, that angularities of from 30° to 60° should also produce an operative device.

OPERATION

In operation, the cutting assembly performs its assigned function through the rotation of drive shaft 22 toward the direction of travel of the mowing machine which in turn rotates spacing members 24 and aligned blade assemblies 20 so that inwardly tapering end surface 54 of cutting surface 42 and shoulder portion 52 of support plate 38 lead blade portions 40 in their engaging of presented vegetation material. As the blade assembly rotates in this fashion, cutting surfaces 42, and specifically cutting edge 56, engage and sever, chop or cut presented vegetation as the cutting edges and cutting surfaces circumscribe a laterally disposed right circular cylinder. The blade portions 40 of each blade assembly 20 overlap each other along the trailing portions of the cutting edges and define a cylinder of revolution which has a substantially straight side wall in which the cutting actions occurs. Moreover, the blade portions 40 of one blade assembly overlap the blade portions of adjacent blade assemblies so that cutting edges 56 of cutting assembly 12 generate a series of integrated right circular cylinders. The overall result is the production of a substantially straight continuous cutting line which severs, chops or cuts presented vegetation in a substantially straight line with no undulations or variations throughout its length.

The cutting action of the cutting assembly consists of a pair of alternating space symmetrical inclined sweeps created by the alternating engagements of the aligned pairs of blade portions 40 with the presented vegetation. As one series of aligned blade portions 40 rotates through its period of cutting action, a series of cutting sweeps inclined with respect to the direction of travel is performed in one direction. Then as those blade portions rotate out of engagement with the vegetation material, the second aligned series of blade portions rotates through its period of cutting action as a second series of inclined cutting sweeps in a direction 90° of inclination from the first series of sweeps. Furthermore, the cutting edges 56 of all the blade portions are presented at a 45° angle to the vegetation material and are moved in two directions (upwardly and forwardly) as the cutting action takes place. The resultant cutting motion approaches a slicing effect which proves far more efficient and effective than a full face driving cut such as created by a rotating blade or reel.

In addition, as mentioned previously, support fingers 28 are positioned so that during the period of cutting action of one blade portion 40 the fingers provide support against the direction of resistance produced by the material to be cut, chopped or severed.

It may further be seen that as the blade assemblies 20 rotate, the principal portion of the cutting action takes place during the upward swing of the blade portions. Therefore, engaged vegetation material is lifted to a substantially vertical position by the pull of the blade portions and then severed as the root system of the material withholds the vegetation within the soil.

It will be apparent that the particular embodiment of the invention shown and described herein is of an illustrative character and that various modifications in construction and arrangement of parts may be made.

Having thus described the invention, what is claimed and desired to be secured by Letters Patent is:

1. A mowing machine cutting assembly comprising a rotatable drive shaft and at least two parallel cutting means mounted on said drive shaft for rotation therewith, said cutting means having cutting edges which define a portion of an ellipse and extend from said drive shaft in an angled relationship to the *y* and *z* coordinates of a three dimensional orthogonal coordinate system superimposed on said cutting assembly so that said drive shaft constituing the *x* coordinate of the coordinate system.

2. A mowing machine cutting asembly as recited in claim 1 wherein said cutting means extend from said drive shaft at an angle of from approximately 30 degrees to approximately 60 degrees with respect to the Y and Z coordinates.

3. A mowing machine cutting assembly as recited in claim 1 wherein said cutting means extend from said drive shaft at an angle of 45 degrees with respect to the Y and Z coordinates.

4. A mowing machine cutting assembly as recited in claim 1 wherein said cutting means are constructed and arranged to perform in rotation a series of alternating sweeps angled with respect to the line of travel so that presented vegetation is severed in alternating angular cuts.

5. A mowing machine cutting assembly as recited in claim 4 wherein said cutting means are overlapped and produce overlapping angular sweeps which generate a continuous straight cutting line with respect to presented vegetation.

6. A mowing machine cutting assembly comprising a rotatable drive shaft and a plurality of cutting means mounted on said drive shaft for rotation therewith, said cutting means extending from said drive shaft in an angled relationship to the *y* and *z* coordinates of a three dimensional orthogonal coordinate system superimposed on said cutting assembly so that said drive shaft constituting the *x* coordinate of the coordinate system, said cutting means comprising support plates mounted on said drive shaft in spaced relationship one from another and arcuate cutting blades removably mounted on said support plates, said support plates including shoulder portions which are recessed from the cutting edges of the blades and have a leading edge with a radius of curvature less than the radius of curvature of the leading cutting edge.

7. A mowing machine cutting assembly as recited in claim 6 including spacing members axially positioned along said drive shatf between adjacent cutting means, said spacing members being constructed and arranged to be driven by said rotatable drive shaft and to drive said cutting means.

8. A mowing machine cutting assembly as recited in claim 7 wherein said spacing members include support fingers constructed and arranged to support said cutting means during their cutting action while also providing a cut material passageway for adjacent cutting means.

9. A mowing machine cutting assembly comprising.

(a) A rotatable drive shaft;

(b) At least two support plates mounted on said drive shaft for rotation therewith; and (c) Arcuate cutting blades removable mounted on said support plates in an angular relationship with respect to the *y* and *z* coordinates of a three dimensional orthogonal coordinate system superimposed on said cutting assembly so that said drive constituting the *x* coordinate of the coordinate system, the cutting edges of said blades defining a portion of an ellipse.

10. The cutting assembly of claim 9 wherein said cutting blades extend from said support plates at an angle of from about 30 degrees to about 60 degrees with respect to the *y* and *z* coordinates.

11. The cutting assembly of claim 10 wherein the cutting edges have arcuate leading edge portions and intermediate edge portions and the leading edge portions have a radius of curvature less than the radius of curvature of the intermediate edge portions.

References Cited

UNITED STATES PATENTS

| | | | |
|---|---|---|---|
| 2,063,067 | 12/1936 | Waller | 56—294 |
| 2,282,238 | 5/1942 | Newton | 56—294 X |
| 2,526,821 | 10/1950 | Jones | 56—253 |
| 2,533,691 | 12/1950 | Remonte | 56—294 |
| 2,640,309 | 6/1953 | Benson | 56—294 |
| 2,716,323 | 8/1955 | Ford | 56—295 |
| 2,772,533 | 12/1956 | Shibley | 56—294 X |
| 2,790,294 | 4/1957 | Marich | 56—294 |
| 3,087,298 | 4/1963 | Phillips | 56—295 |

FOREIGN PATENTS 848,018 9/1960 Great Britain.

LOUIS G. MANCENE, Primary Examiner

J. A. OLIFF, Assistant Examiner